(12) United States Patent
Molloy

(10) Patent No.: US 8,001,995 B2
(45) Date of Patent: Aug. 23, 2011

(54) END CAP FOR A HYDRAULIC FITTING

(76) Inventor: Gregory Molloy, Tarrytown, NY (US)

( * ) Notice: Subject to any disclaimer, the term of this patent is extended or adjusted under 35 U.S.C. 154(b) by 81 days.

(21) Appl. No.: 12/144,013

(22) Filed: Jun. 23, 2008

(65) Prior Publication Data

US 2009/0315324 A1 Dec. 24, 2009

(51) Int. Cl.
*F16L 57/00* (2006.01)
(52) U.S. Cl. .......... 138/89; 138/96 T; 285/387; 285/388
(58) Field of Classification Search .............. 138/89, 138/90, 96 T; 285/354, 386, 387, 388, 389
See application file for complete search history.

(56) References Cited

U.S. PATENT DOCUMENTS

| | | | |
|---|---|---|---|
| 266,862 A | 10/1882 | Meyrick et al. | |
| 1,564,965 A * | 12/1925 | Kraft et al. | 285/327 |
| 1,984,945 A * | 12/1934 | Roby | 73/326 |
| 2,294,637 A * | 9/1942 | Thomsen | 285/327 |
| 2,334,424 A * | 11/1943 | Livermont | 138/96 T |
| 2,454,555 A * | 11/1948 | Henderson et al. | 138/89 |
| 2,497,273 A * | 2/1950 | Richardson | 285/334.5 |
| 2,770,260 A * | 11/1956 | Henderson | 138/89 |
| 2,902,297 A * | 9/1959 | Cowan | 285/88 |
| 3,498,647 A * | 3/1970 | Schroder | 285/343 |
| 3,606,073 A * | 9/1971 | Burke | 220/288 |
| 3,777,627 A | 12/1973 | Goade | |
| 3,814,135 A * | 6/1974 | Hetzer et al. | 138/89 |
| 4,205,707 A | 6/1980 | Lundgren | |
| 4,582,444 A * | 4/1986 | Miskinis | 403/16 |
| 4,867,043 A | 9/1989 | Antkowiak | |
| 4,887,646 A | 12/1989 | Groves | |
| 4,982,763 A | 1/1991 | Klahn | |
| 5,016,671 A | 5/1991 | Barwise | |
| 5,145,219 A * | 9/1992 | Babuder | 285/330 |
| 5,350,205 A * | 9/1994 | Aldridge et al. | 285/328 |
| 6,135,156 A | 10/2000 | Donoho et al. | |
| 6,361,260 B1 | 3/2002 | Schirrmacher | |
| 6,382,683 B1 * | 5/2002 | Albright et al. | 285/330 |
| 6,912,933 B2 | 7/2005 | Knopp et al. | |
| 7,134,454 B2 | 11/2006 | Montminy | |
| 7,597,117 B1 * | 10/2009 | Groso et al. | 138/89 |
| 2010/0117359 A1 * | 5/2010 | Herndon | 285/354 |

OTHER PUBLICATIONS

International Search Report for International Patent Application No. PCT/US2009/047914 dated Aug. 17, 2009.
Written Opinion for International Patent Application No. PCT/US2009/047914 dated Aug. 17, 2009.

* cited by examiner

*Primary Examiner* — James Hook
(74) *Attorney, Agent, or Firm* — K&L Gates LLP

(57) ABSTRACT

An end cap for an open end of a hydraulic fitting having a peripheral flange can be provided by a threaded ring and a threaded insert. The threaded insert can be rotatably engaged with the threaded ring to move axially back and forth. The threaded insert has a forward end face which can engage the open end of the hydraulic fitting to close the hydraulic fitting end or to couple with it. The threaded ring includes a locking member to embrace and engage the peripheral flange. The end cap can be used to prevent loss of oil from the hydraulic fitting during service of equipment on which the hydraulic fitting is utilized, and for other purposes.

11 Claims, 11 Drawing Sheets

END CAP FOR A HYDRAULIC FITTING

STATEMENT REGARDING FEDERALLY SPONSORED RESEARCH OR DEVELOPMENT (Not applicable.)

The present invention relates to an end cap for a hydraulic fitting and to hydraulic, pneumatic or other fittings or equipment provided with the inventive end cap. More particularly, but not exclusively, the invention relates to an end cap suitable for closing or sealing an open end of a hydraulic fitting wherein the hydraulic fitting comprises a peripheral annular flange extending around the open end.

BACKGROUND OF THE INVENTION

There are a variety of circumstances in which it may be desirable to close or seal the open end of a hydraulic, pneumatic or other fitting. For example, when hydraulic equipment such as a construction vehicle or the like, is being serviced, oil-filled hydraulic lines, pipes and fittings are often disassembled during service and maintenance procedures. Much of the oil, or other working fluid, can be drained from many of these components without undue difficulty but a residue will often remain within the lines, pipes or fittings. This residual oil is prone to drip or drain from open fitting ends during service procedures, and may contaminate equipment surfaces, floors and other surfaces in the vicinity of the work area creating dirty, slippery and perhaps dangerous conditions. It is accordingly desirable to provide an end cap to close such open ends that can be easily manipulated in a service bay, a workshop or in the field and can be assembled with an open ended fitting to close or seal it either by manual manipulation or by the use of simple tools. The presence of an annular flange around the end of some fittings may complicate the end closure problem.

To attempt to solve this problem it is known to provide a plastic cap to cover the fitting end. One example of such a plastic cap is a simple, lightweight, dish-shaped resilient cap which is a close fit over a flanged pipe end and has a modest retaining lip engagesble under the flange. Such plastic caps appear to be intended to keep out dirt and may retain some oil within the pipe they may not be satisfactory for some purposes because they are readily removed and cannot hold pressure. These shortcomings can be problematic in some cases, for example when it is desired to pressurize a flanged hydraulic fitting for test purposes or other reasons.

The patent literature contains proposals for end caps for hydraulic fittings. For example, U.S. Pat. No. 7,134,454 to Montminy discloses an end cap for blocking a pipe which employs a latch movable between latched and unlatched positions to engage a rim around the end of the pipe. Also U.S. Pat. Nos. 4,205,707; 4,887,646; 4,982,763; 6,135,156; disclose various caps, plugs, closures or fittings for pipes, tubing and the like.

Nevertheless, there is a need for an end cap that can be used to cap a flanged hydraulic fitting and which can be employed in a hydraulic equipment service facility and for other purposes.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

BRIEF SUMMARY OF THE INVENTION

The present invention provides, in one aspect, an end cap for an open end of a hydraulic fitting. Suitable hydraulic fittings can comprise a peripheral annular flange extending around the open end of the hydraulic fitting. The end cap can comprise a ring threaded about an axis and a threaded insert threadably engageable with the threaded ring. The threaded insert can thus move axially with respect to the threaded ring in response to rotation of the threaded insert with respect to the threaded ring. The threaded insert can comprise a forward end face and can be configured for the forward end face to be engageable with the open end of the hydraulic fitting.

In addition, the end cap can include a locking member integral with the threaded ring. The locking member can be configured to embrace the peripheral annular flange and can comprise a locking surface engageable with a peripheral flange surface remote from the threaded ring. The threaded insert can be inserted into the threaded ring and can be rotated to bring the threaded insert engagement surface into closing engagement with the hydraulic fitting. If desired, the threaded insert can be rotatable to clamp the hydraulic fitting annular flange between the locking surface and the engagement surface of the threaded insert.

In one embodiment of end cap according to the invention, the end face of the threaded insert can occlude and seal the open end of the hydraulic fitting.

In another embodiment of end cap according to the invention, useful as a coupling end cap, the threaded insert comprises a fluid passage extending through the threaded insert to communicate fluid from the hydraulic fitting through the end cap.

The locking member can define with the threaded ring a lateral opening to receive the hydraulic fitting annular flange in a direction transverse to the axis. If desired, the threaded ring can comprise a side wall and the locking member can comprise a forward portion of the side wall.

In one embodiment of the invention, the side wall comprises a cutout, the cutout defines a side facing receiving opening and the side wall is undercut in the vicinity of the receiving opening to provide a U-shaped slot. With such a construction, the flanged open end of the hydraulic fitting can be laterally received in the receiving opening and can be moved along the U-shaped slot.

In another embodiment of the invention, the locking member comprises a lip engageable with the hydraulic fitting annular flange the lip having an inner periphery with a part circular portion and two parallel straight portions. The hydraulic fitting can be received between the straight lip portions and the threaded insert can be rotated to clamp the hydraulic fitting annular flange between the peripheral lip and the engagement surface of the threaded insert. If desired, the locking member can comprise a continuous side wall joining the peripheral lip.

The hydraulic fitting can comprise a hydraulic pipe or hose end fitting and the invention includes a hydraulic system comprising the hydraulic fitting and an end cap according to the invention wherein the end cap caps the hydraulic fitting.

In another aspect, the invention provides a two-piece end cap for an open flanged end of a hydraulic pipe or hose fitting, the end cap comprising a ring having a slot and an internal thread, wherein the ring can slide over the flange in a direction radially of the hydraulic fitting with the slot in the ring receiving and accommodating the flanging of the flanged end and comprising a threaded plug wherein the threaded plug can be screwed into the ring to seal the open flanged end of the hydraulic fitting.

BRIEF DESCRIPTION OF THE SEVERAL VIEWS OF THE DRAWING

Some embodiments of the invention, and of making and using the invention, as well as the best mode contemplated of carrying out the invention, are described in detail herein and, by way of example, with reference to the accompanying drawings, in which like reference characters designate like elements throughout the several views, and in which.

DETAILED DESCRIPTION OF THE INVENTION

Figure 1:
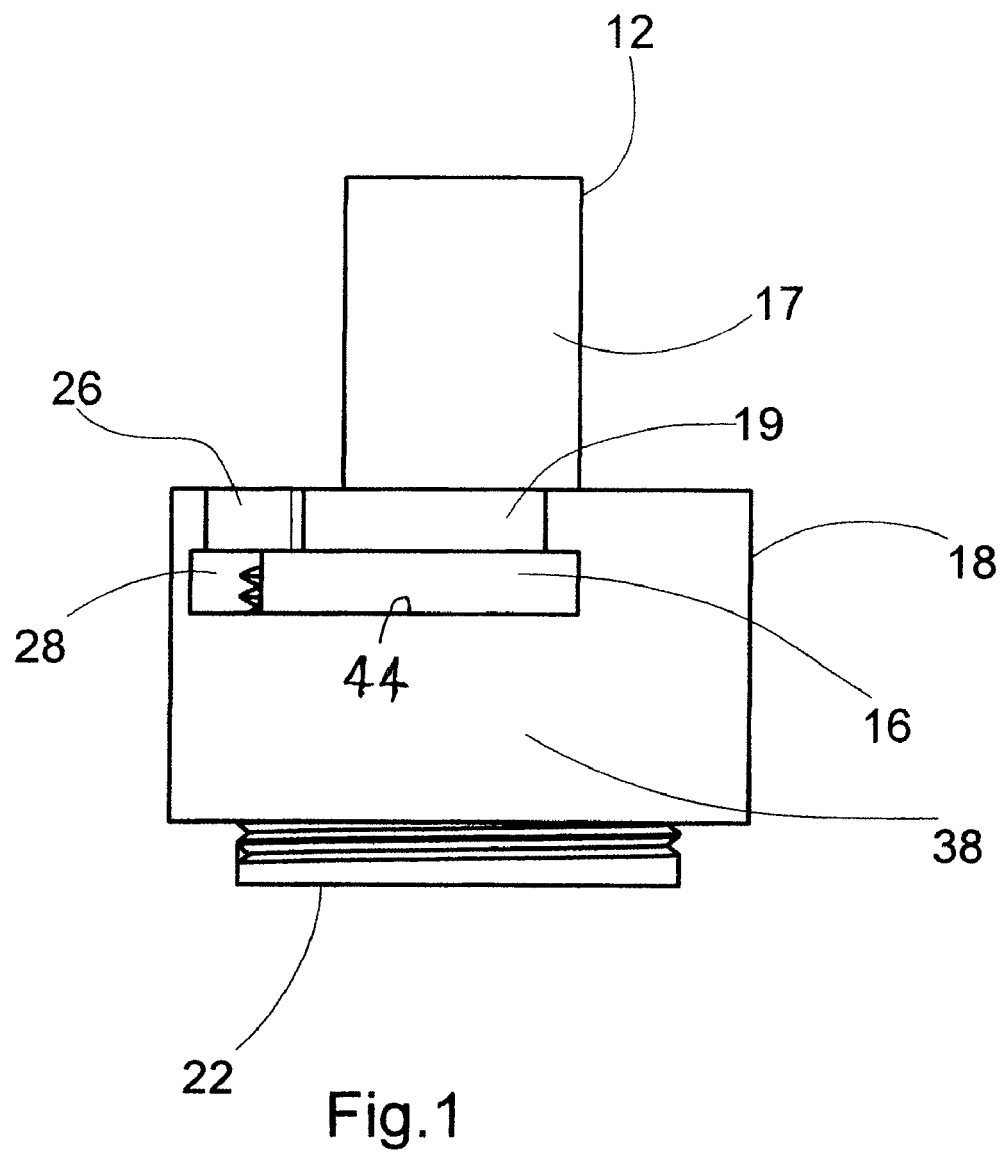
FIG. 1 is a first side elevational view of one embodiment of end cap according to the invention shown assembled with a hydraulic fitting, wherein the end cap closes an open end of the hydraulic fitting.
Figure 2:
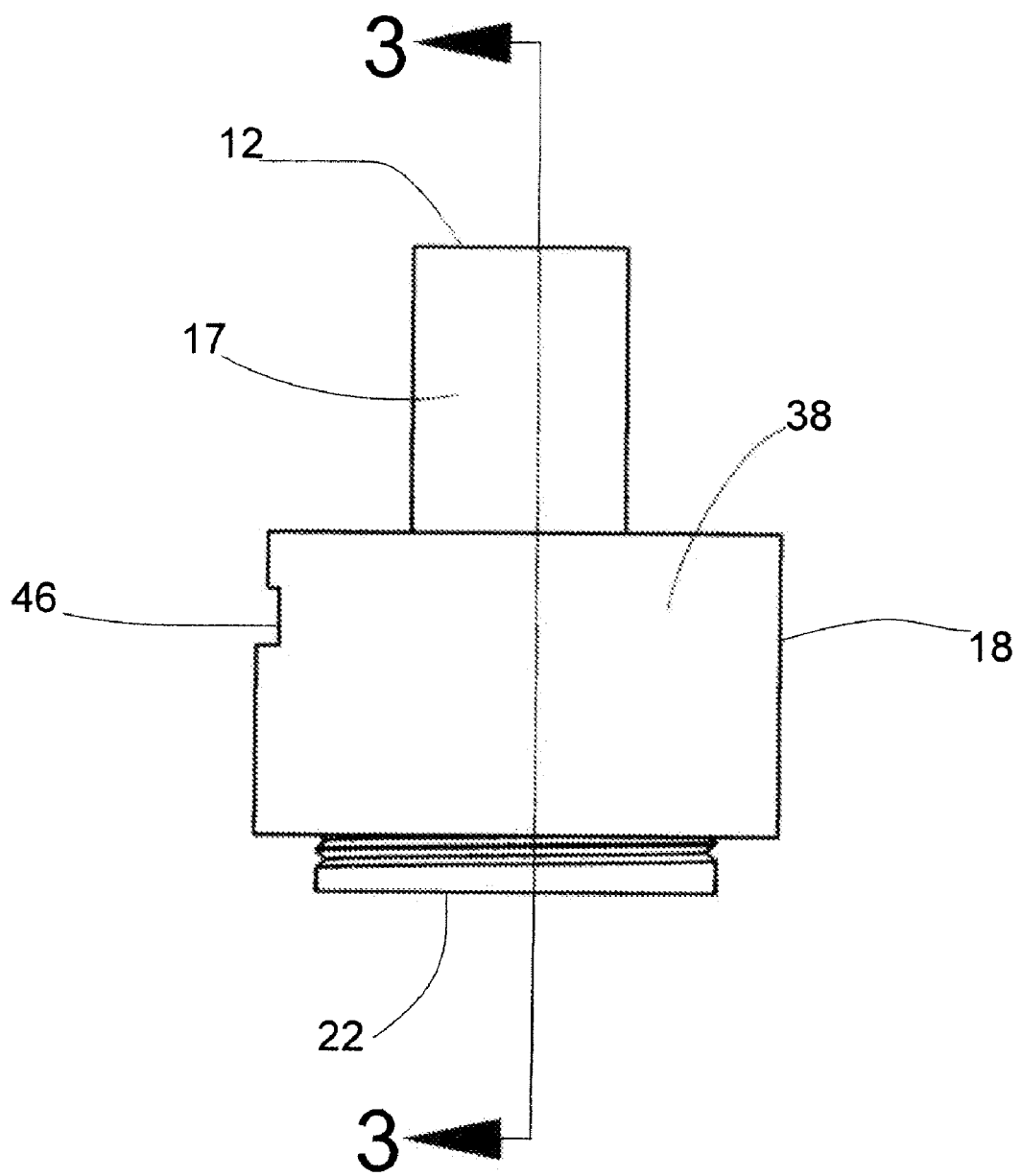
FIG. 2 is a second side elevational view of the end cap and hydraulic fitting assembly shown in FIG. 1 from a different direction.
Figure 3:
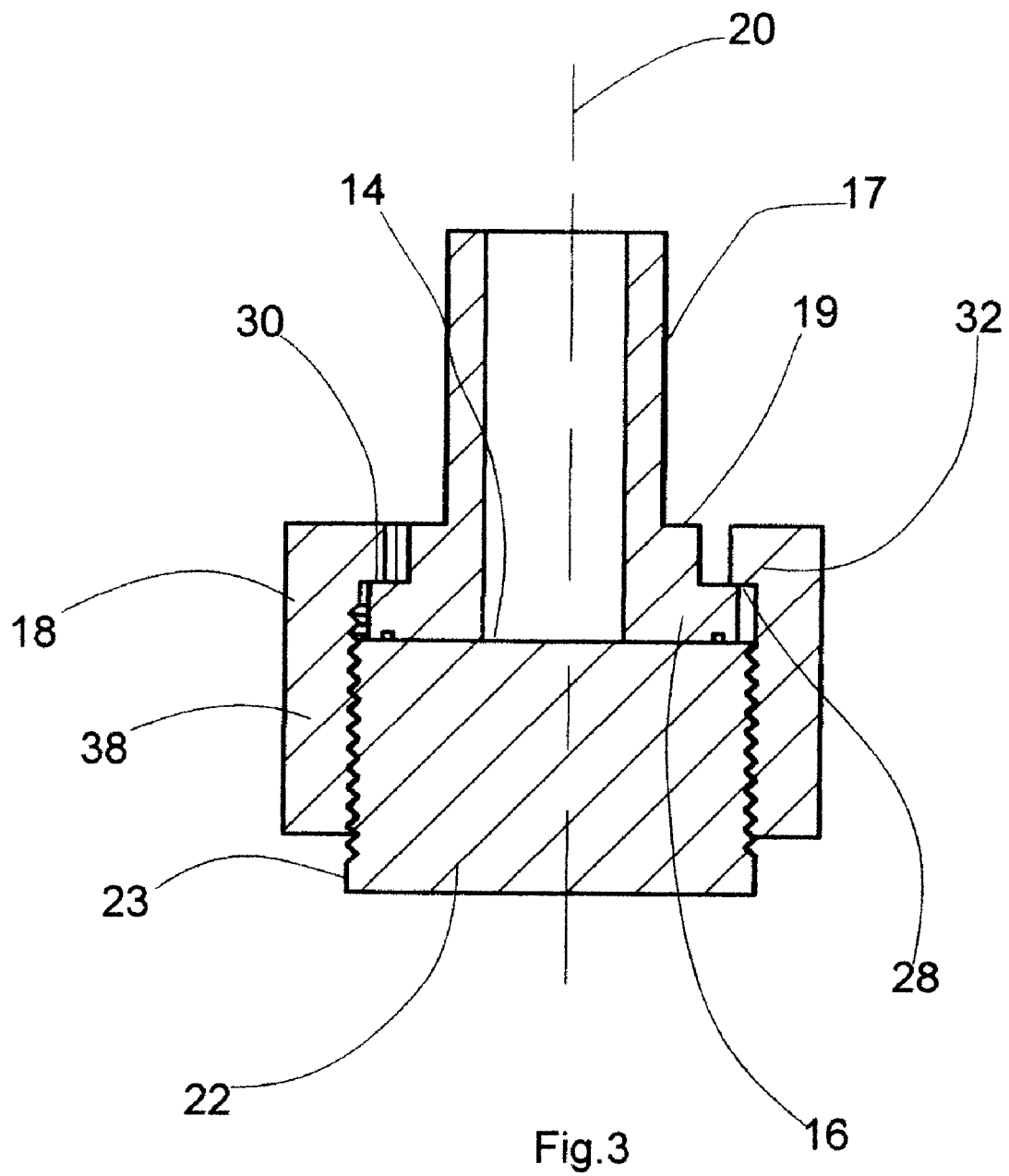
FIG. 3 is a section on the line 3-3 of FIG. 2.
Figure 4:
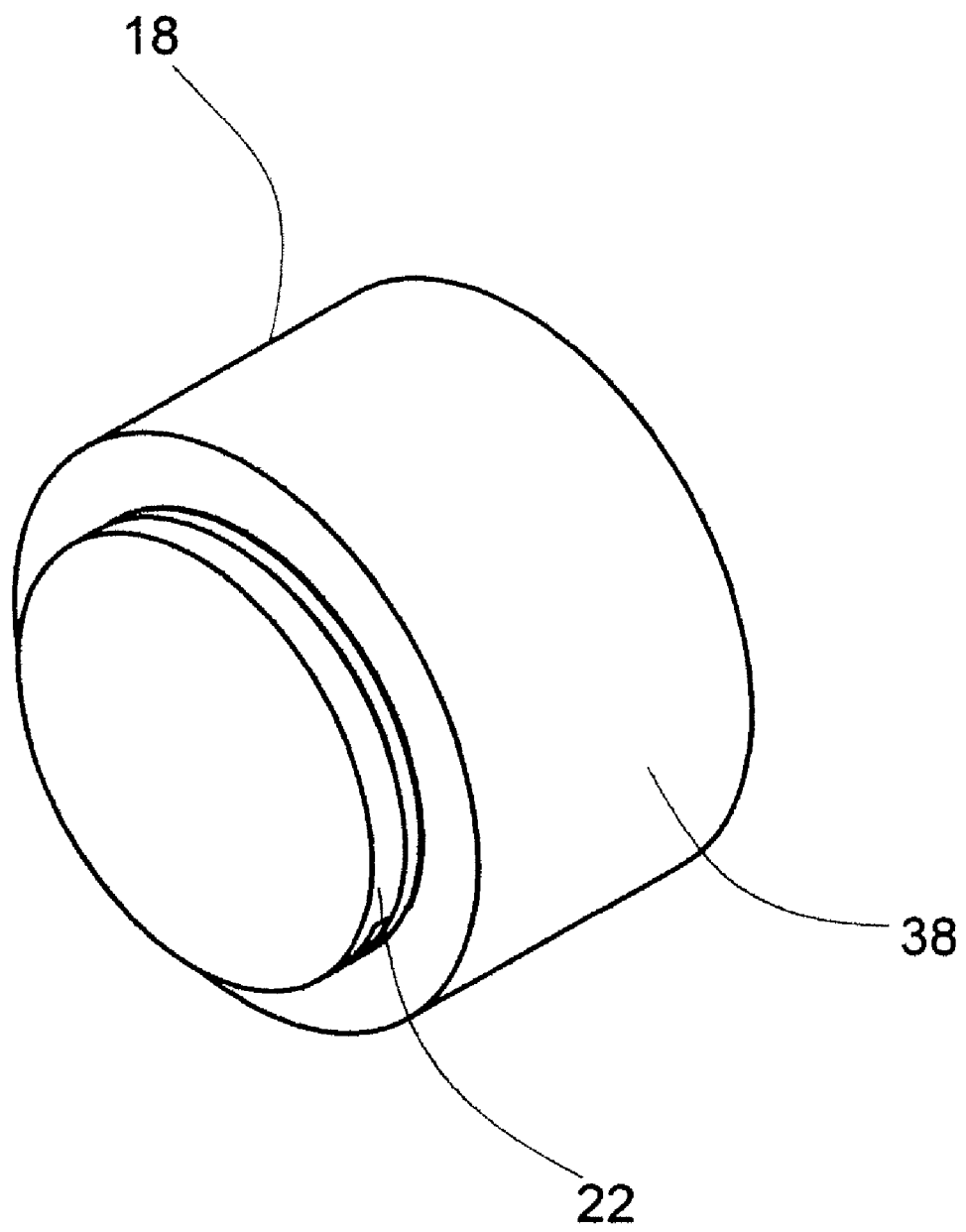
FIG. 4 is a rear perspective view of the end cap shown in FIG. 1, turned through 90° as compared with the FIG. 1 view.
Figure 5:
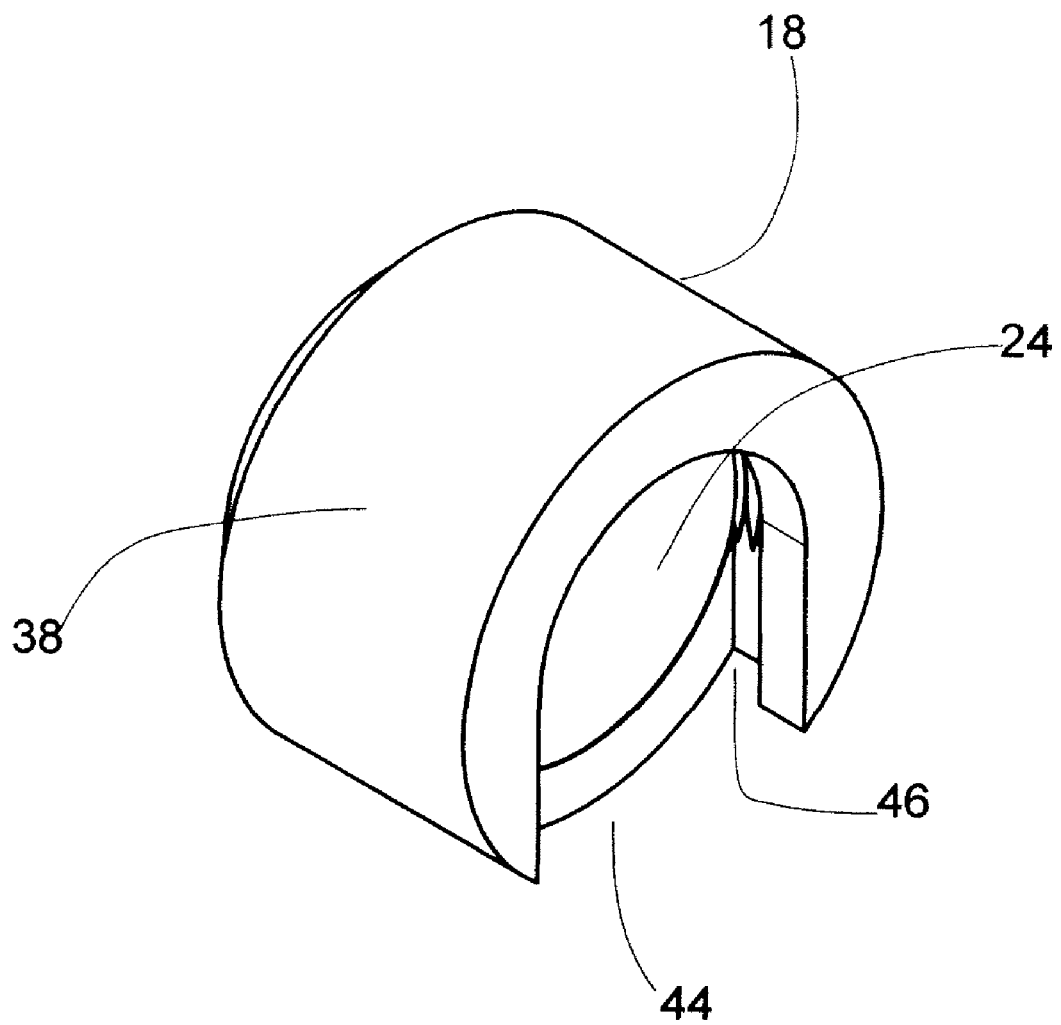
FIG. 5 is a front perspective view of the end cap shown in FIG. 4.
Figure 6:
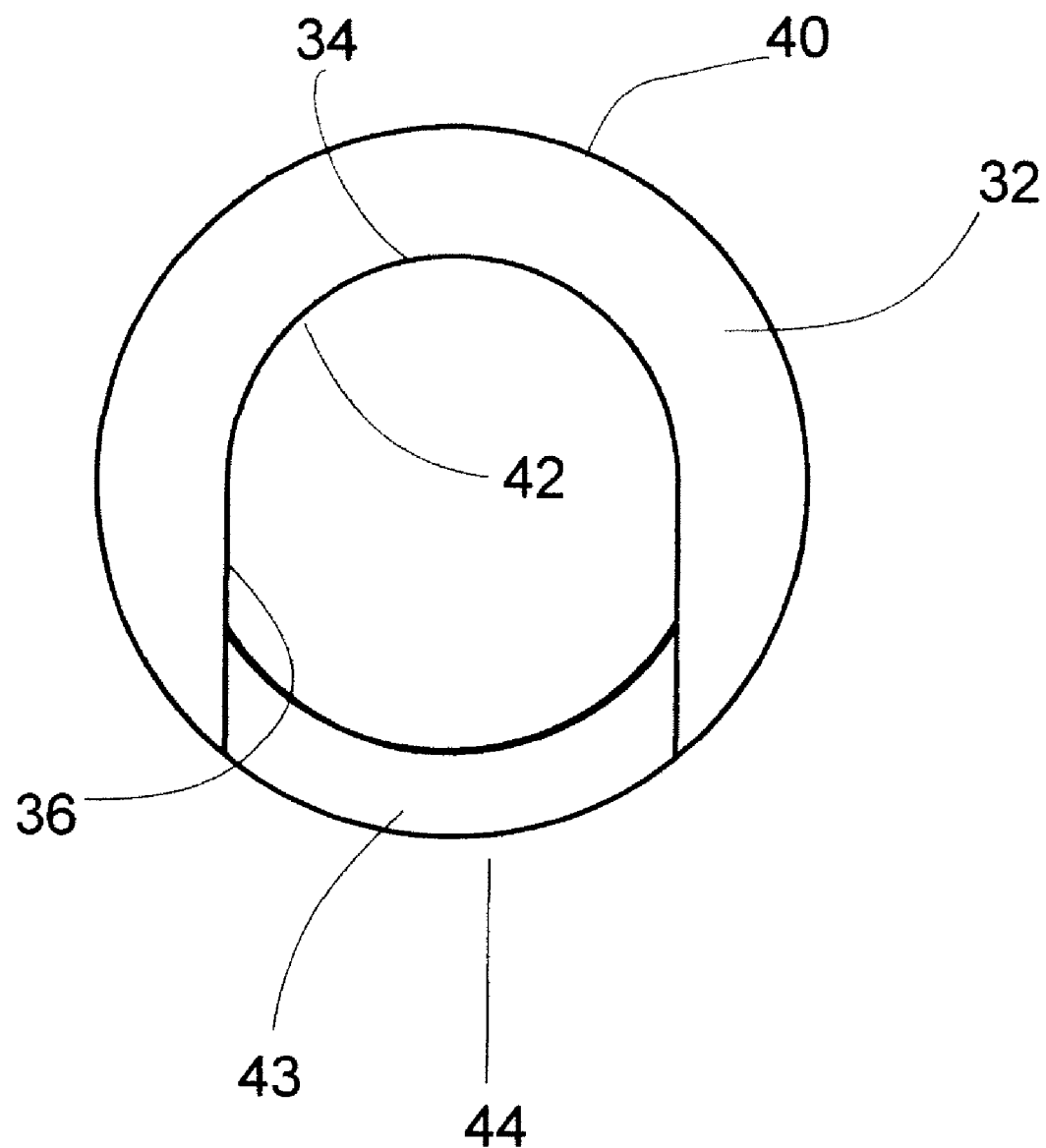
FIG. 6 is a front view of the end cap shown in FIG. 4.
Figure 7:
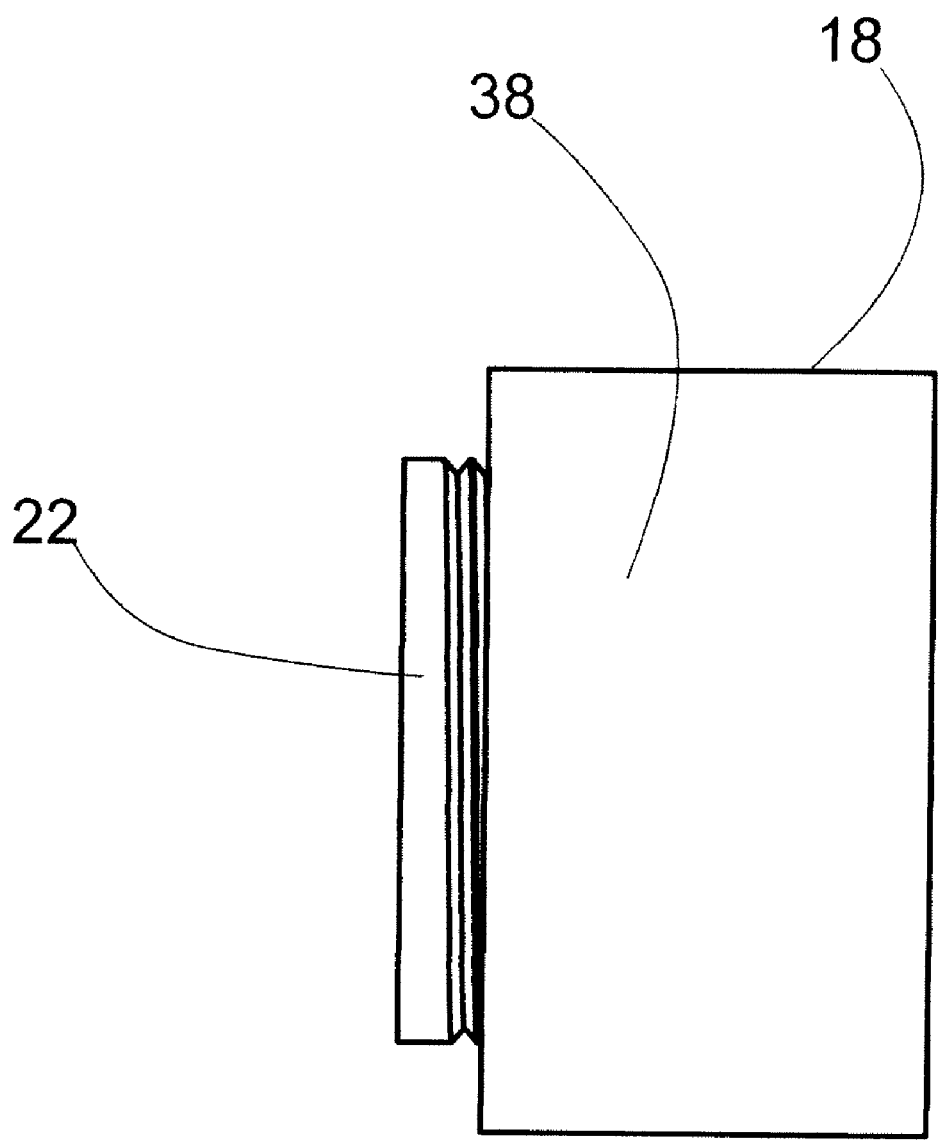
FIG. 7 is a top view of the end cap shown in FIG. 6.
Figure 8:
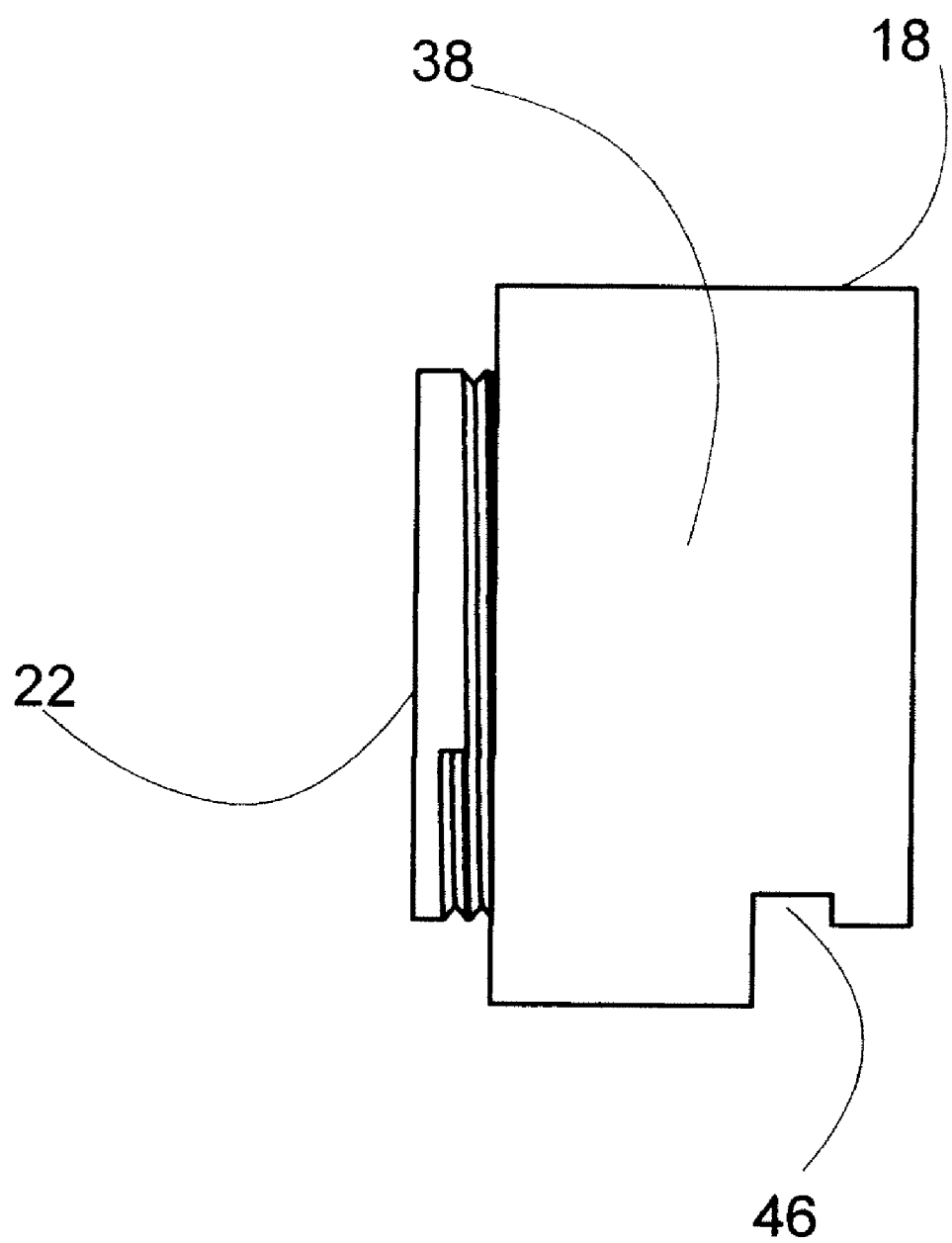
FIG. 8 is a lefthand side view of the end cap shown in FIG. 6.

Referring to FIGS. 1-8 of the drawings, the illustrated embodiment of the invention comprises an end cap 10 assembled with an annular hydraulic fitting 12 having an open end 14.

The illustrated embodiment of hydraulic fitting 12 comprises a peripheral annular flange 16 which extends continuously around open end 14, projecting laterally from a tubular body 17 above a collar 19. As shown, tubular body 17 of hydraulic fitting 12 has circular inner and outer cross-sectional shapes so that hydraulic fitting 12 is suitable to serve as a conduit for hydraulic fluid or to serve other purposes. In the illustrated embodiment, open end 14 of tubular body 17 has a plane, circular shape and the outer surfaces of tubular body 17 and annular flange 16 are smooth and free of threading, projections or other structure. Some other possible configurations of annular flange 16 are described below and further possible embodiments will be, or become, apparent to a person of ordinary skill in the art in light of this description.

Hydraulic fitting 12 can have any desired dimensions, with end cap 10 being proportioned accordingly. For example, hydraulic fitting 12 can have an internal diameter in the range of from about 1.5 mm to about 300 mm (or from about 1/16 inch to about 12 inches). Some embodiments of the invention are suitable for use with a hydraulic fitting 12 having an internal diameter in the range of from about 12 mm to about 100 mm (or from about ½ inch to about 4 inches).

Hydraulic fitting 12 is exemplary of a wide range of hydraulic fittings useful for managing hydraulic fluids which can be capped by end cap 10 to close open end 14, to connect open end 14 with another fluid conduit or fitting, to adapt the termination of open end 14, or to serve another useful purpose. For example, hydraulic fitting 12 can be a flanged hydraulic fitting such as is supplied by Caterpillar and other manufacturers in accordance with SAE Code 61 or SAE Code 62 or for other purposes. Some examples are Caterpillar #12 Code 61 and #20 Code 62 in various sizes, for example with an internal tube diameter in the range of from about ½ in (about 12 mm) to about 3 in (about 75 mm).

Other hydraulic fittings, and other configurations of annular flange 16 that can usefully be employed in practicing the present invention will be or become apparent to a person of ordinary skill in the art.

In servicing certain types of hydraulic equipment, for example, construction machines such as a backhoe, a mechanical shovel, a front loader or a bulldozer, hydraulic fittings such as hydraulic fitting 12 are sometimes disconnected from other hydraulic components. Even if the equipment is drained beforehand, the resultant open end may discharge residual oil contaminating equipment or facility surfaces in the vicinity of the open end and possibly creating hazardous conditions. Simple plastic end caps may leak fluid, especially if hydraulic fitting 12 is pressurized during maintenance for example for test purposes, or for other reasons. It may also be desirable to adapt hydraulic fitting 12 to have a different termination, for example a screw thread, or to provide it with a connector to enable it to be connected it with other equipment. Various embodiments of end cap according to the present invention, such as end cap 10, can solve or ameliorate one or more of these and other problems.

The embodiment of end cap 10 illustrated in FIGS. 1-8 comprises a ring 18 threaded about an axis 20 and a threaded insert 22 which can be threadably engaged with threaded ring 18. By virtue of the threading, threaded insert 22 can be advanced into threaded ring 18, or retracted therefrom, by appropriate rotation of threaded insert 22 with respect to threaded ring 18. Rearward end 23 of threaded insert 22 can be configured or structured to facilitate its being manually gripped, or engaged by a tool to rotate threaded insert 22 with respect to threaded ring 18. For example, rearward end 23 can project rearwardly from threaded ring 18 when threaded insert 22 is fully advanced into threaded ring 18 and can have an outer surface that is knurled, roughened or shaped with indents or projections to facilitate gripping or engagement.

In one embodiment of the invention, rearward end 23 is formed with flats or depressions or has a hexagonal or other suitable cross-section to be engageable by wrench or other tool. Alternatively, rearward end 23 can be axially recessed with a hexagonal or other shaped recess to receive a suitable tool.

In some embodiments of the invention, threaded insert 22 can be of one-piece, integral or monolithic construction and can be fabricated by machining, molding or casting from a suitable material. Threaded insert 22 can be fabricated from any suitable material, for example, a suitable structural synthetic polymer, such as a polycarbonate or nylon, a metal or metal alloy, aluminum alloy, steel or another ferrous alloy. In an embodiment of the invention suitable for heavy duty hydraulic applications, for example for use with construction machinery, threaded insert 22 can comprise a solid plug machined from steel or stainless steel.

In other embodiments of the invention, threaded insert 22 can have other constructions, as will be known or apparent to a person of ordinary skill in the art. For example, threaded insert 22 can comprise two or more components assembled together into an integral unit. One component could carry the threads and another component could comprise rearward end 23 of threaded insert 22. Alternatively, or in addition, threaded insert 22 can be hollow and optionally can be braced to give it greater rigidity and strength, with one or more internal struts or cross members.

The embodiment of threaded insert 22 shown in the drawings comprises an end face 24 and is configured for end face 24 to be engageable with open end 14 of hydraulic fitting 12. For example, threaded insert 22 can be inserted into threaded ring 18 and rotated to bring end face 24 of threaded insert 22 into engagement with hydraulic fitting 12.

End face 24 is shown as being a plane surface which extends continuously across insert 22 to fill the area of threaded ring 18 across axis 20 and to be capable of covering or closing, and potentially sealing, open end 14 of hydraulic fitting 12 when brought into engagement therewith. In other embodiments of the invention, end face 24 can have a non-planar structure, being curved convexly or concavely, being conical or stepped or otherwise configured. If desired, end face 24 may have one or more openings, which opening or openings can be blind or can communicate with other structure or equipment, if desired. In further embodiments of the invention, end face 24 can be recessed, or otherwise configured to bear a seal, of a suitable material, for example a polymer such as polytetrafluoroethylene, natural or synthetic rubber, copper, bronze or other suitable sealing material, the seal being designed to engage and seal against open end 14. Alternatively, end face 24 can be substantially covered with a suitable sealing material secured to end face 24 by adhesive, stamping, welding, mechanical devices such as clips or one or more bolts or screws, or by other suitable means.

In the illustrated embodiment of the invention, threaded ring 18 further comprises a locking member 26 which can be integral with threaded ring 18 or is otherwise attached to threaded ring 18. Desirably, locking member 26 defines with threaded ring 18 a lateral opening to receive annular flange 16 in a direction transverse to, or radially of, axis 20. For example, locking member 26 can be configured to embrace annular flange 16. Locking member 26 can have a locking surface 28 which is engageable with a peripheral surface 30 of annular flange 16 of hydraulic fitting 12. Peripheral surface 30 desirably is disposed on the opposite side of annular flange 16 from open end 14. Also, locking surface 28 desirably is spaced apart from end face 24 of threaded insert 22 so that annular flange 16 can be received between locking surface 28 and end face 24 of threaded insert 22.

Accordingly, threaded insert 22 can be tightened, by rotating it, to clamp annular flange 16 of hydraulic fitting 12 between locking surface 28 and end face 24 of threaded insert 22.

In one embodiment of the invention (not shown), locking member 26 comprises one or more, desirably two or more, claw-like members that are peripherally spaced apart around threaded ring 18. Three or four, or another suitable number, of claw-like members can be employed, if desired. Desirably, at least one of the spaces between adjacent claw-like members is adequate to receive annular flange 16 between them, in a lateral direction, which is to say, transversely to axis 20. For this purpose, the spacing can be sufficient to receive at least the smallest transverse dimension of annular flange 16. In the case of a circular annular flange 16, this dimension can be the diameter of the flange.

In the illustrated embodiment of the invention, locking member 26 comprises a U-shaped lip 32 which is engageable with locking surface 30 on annular flange 16. As illustrated, lip 32 has an inner periphery comprising a part-circular portion 34, which optionally can be approximately semicircular, and two parallel straight portions 36. Hydraulic fitting 12 and annular flange 16 can be received between the two straight portions 36 of lip 32.

As shown, threaded ring 18 comprises a continuous side wall 38 having a right cylindrical outer surface 40 and a right cylindrical inner surface 42 which is threaded and which, in turn, defines a cylindrical volume that can receive threaded insert 22. Outer surface 40 can have other configurations, for example a hexagonal cross section, if desired, and can be smooth, knurled, roughened or have another surface characteristic, if desired. Lip 32 projects inwardly from the forward portion of side wall 38, referring to the direction of engagement of end cap 10 with hydraulic fitting 12. In this embodiment of the invention, the forward portion of side wall 38, in the vicinity of slot 46, provides, or constitutes, locking member 26.

The forward end of threaded ring 18 has a cutout 43 in side wall 38 which defines a side facing receiving opening 44. Side wall 38 is undercut in the vicinity of receiving opening 44 to provide a U-shaped slot 46 defined in part by lip 32. Receiving opening 44 and slot 46 can be dimensioned and configured so that hydraulic fitting 12 can be received laterally into receiving opening 44 and can be moved transversely of axis 20 to bring open end 14 of hydraulic fitting 12 into axial alignment with end face 24 of threaded insert 22.

Desirably, annular flange 16 can be received into slot 46 and can be moved along slot 46. For example, annular flange 16 can be a close sliding fit with slot 46 and can abut the curved portion of slot 46, with part-circular portion 34 of peripheral lip 32 engaging tubular body 17 of hydraulic fitting 12, when properly aligned. This arrangement can provide a stop locating hydraulic fitting 12 in alignment with threaded insert 22.

As can be seen from FIG. 1, receiving opening 44 remains open after the hydraulic fitting annular flange is received into slot 46.

Other arrangements and constructions of threaded ring 18 that will meet one or more of the objectives of the invention are possible. For example, threaded ring 18 can be formed with a second receiving opening (not shown) opposite to receiving opening 44, provided by a second cutout and undercutting, to enable hydraulic fitting 12 optionally to be received into threaded ring 18 from the opposite direction. With this arrangement, one or more detents and cooperative recesses, or other suitable structures, can be provided to locate hydraulic fitting 12 in alignment with threaded insert 22.

When threaded insert 22 and hydraulic fitting 12 are suitably aligned, threaded insert 22 can be rotated, advancing threaded insert 22 forwardly into threaded ring 18. The forward movement of threaded insert 22 can bring end face 24 of threaded insert 22 into clamping engagement with open end 14 of hydraulic fitting 12. The resultant forward thrust is borne by engagement of annular ring 16 with peripheral lip 32 of threaded ring 18.

In one embodiment of the invention, threaded ring 18 has a substantial, solid, plug-like construction. If desired, threaded ring 18 can be of one-piece, integral or monolithic construction and can be fabricated by machining, molding or casting from a suitable material. Like threaded insert 22, threaded ring 18 can be fabricated from any suitable material, for example, a suitable structural synthetic polymer, such as a polycarbonate or nylon, a metal or metal alloy, aluminum alloy, steel or another ferrous alloy.

In other embodiments of the invention, threaded ring 18 can have other constructions, as will be known or apparent to a person of ordinary skill in the art. For example, threaded ring 18 can comprise two or more components assembled together into an integral unit. One component could carry the threads and another component could comprise locking member 26.

In an embodiment of the invention suitable for heavy duty hydraulic applications, for example for use with construction machinery, threaded ring 18 can comprise a monolithic component machined from steel or stainless steel. For such applications, it can be desirable, for both threaded ring 18 and threaded insert 22 to have sufficient strength for substantial torque to be applied so that end face 24 of threaded insert 22 can exert an adequate axial closing force on open end of hydraulic fitting 12 to make an oil-tight, metal-to-metal seal.

Annular flange 16 of hydraulic fitting 12 can have a continuous or discontinuous construction. Continuous embodiments of annular flange 16 can have various configurations, for example a circular outer periphery, as shown, a hexagonal, square or other polygonal outer peripheral shape, an oval, elliptical or other suitable outer peripheral shape. The cross-sectional shape of annular flange 16 can be essentially rectangular, as shown or can be rounded, curved or triangular or another suitable shape. Two or more annular flanges 16 can be employed, and can for example, be disposed closely together to function essentially as a single flange.

Optionally, annular flange 16 can have a circular recess 48 extending around open end 14 to receive a sealing ring during normal use of hydraulic fitting 12, as is known to a person of ordinary skill in the art.

Discontinuous embodiments of annular flange 16 can be employed, if desired. Such discontinuous embodiments can have one, two or more peripheral gaps, can be essentially digitated, can comprise multiple lateral projections from tubular body 17, for example three or four or more projections or short ribs or detent-like structures.

In another modified embodiment of the invention (not shown), threaded ring 18 is externally threaded and threaded insert 22 comprises an internally threaded sleeve to extend around threaded ring 18 and engage the external thread. Threaded insert 22 can further comprise a piston-like member within the threaded sleeve which can extend through the externally threaded ring 18 to engage and seal open end 14 of hydraulic fitting 12. For this purpose, the piston like member and the inner wall of threaded ring 18 can be smooth and close fitting, one to the other, if desired.

Alternative means to threading can be employed for movably attaching ring 18 to insert 22, if desired. For example an unthreaded version of insert 22 can be axially slidable in an unthreaded version of threaded ring 18. In such an embodiment of the invention, one or more releasable detents, clamps, or other suitable devices can be employed to hold the unthreaded insert engaged with open end 14 of hydraulic fitting 12.

One method of using end cap 10 comprises assembling threaded insert 22 with threaded ring 18, if it is not already assembled, and rotating threaded insert 22 relatively to threaded ring 18 to screw threaded insert partially into threaded ring 18, desirably stopping short of a fully advanced position. If necessary, threaded insert 22 can be backed off to a suitable partially advanced position. These steps can often be performed manually, but a tool or tools can be employed, if desired.

End cap 10 can then be brought into engagement and assembled with hydraulic fitting 12. Gripping one component in one hand, and the other component in the other hand, or in another suitable manner, end cap 10 is moved towards hydraulic fitting 12 so as to cause locking member 26 to embrace annular flange 16. Desirably, this movement can be effected by aligning the components in the axial direction, with a lateral offset one from the other, and then moving end cap 10 towards hydraulic fitting 12 in a lateral direction to a point where the axes of the two components are aligned and locking member 26 embraces annular flange 16. For example, referring to the illustrated embodiment, annular flange 16 can be aligned with receiving opening 44 and then moved along U-shaped slot 46 until it is snugly located in the curved portion of U-shaped slot 46 with the axes of the two components aligned and with end face 24 of threaded insert 22 opposite open end 14 of hydraulic fitting 12.

With end cap 10 appropriately assembled to hydraulic fitting 12, threaded insert 22 can be rotated into tight engagement with hydraulic fitting 12, by hand or by using a suitable tool to engage rearward end 23 of threaded insert 22. Employing the embodiment of end cap 10 illustrated in FIGS. 1-8 of the drawings, such tightening can bring end face 24 into sealing engagement with open end 14, the sealing thrust being taken by clamping engagement of lip 32 with annular flange 12. With annular flange 16 located in the curved portion of U-shaped slot 46, the part-circular portion 34 and parts of the straight portions 36 of lip 32 provide a secure seat for annular flange 16 permitting end cap 10 to be securely clamped on to hydraulic fitting 12 with threaded insert 22 closing, and optionally sealing open end 14 of hydraulic fitting 12.

In the modified embodiment of the invention illustrated in FIGS. 11-14, lip 32 has a part-circular recess 50 which can closely accommodate annular flange 16 for axial movement forwardly with respect to lip 32. The part-circular recess 50 defines ends 52 of straight portions 36 of side wall 38 in the vicinity of cutout 43 which act as retainers preventing radial movement of annular flange 16 and hydraulic fitting 12 when annular flange 16 is seated in recess 50. With this modification, a flanged hydraulic fitting 12 can slide into U-shaped slot 46 of threaded ring 18 and can be moved axially by rotating threaded insert 22 into threaded ring 18 and tightening end face 24 against flange 16 to drive flange 16 forwardly along the ring axis to seat in the recess in lip 32. In this position, flange 16 is securely locked against lateral movement out of end cap 10 by the retainers constituted by the ends 52 of straight portions 36 of side wall 38 in the vicinity of cutout 43 and is unlikely to separate from end cap 10 even when end face 24 is only loosely engaged with flange 16.

Useful embodiments of end cap 10 can be quickly and easily assembled with hydraulic fitting 12 to provide a good leak-preventing seal with open end 14 of hydraulic fitting 12. Furthermore, in some embodiments of the invention the assembled hydraulic fitting 12, end cap 10 can be subjected to significant hydraulic or pneumatic pressure from fluid supplied within tubular body 17 for operational, service or test purposes, without leakage.

Figure 9:
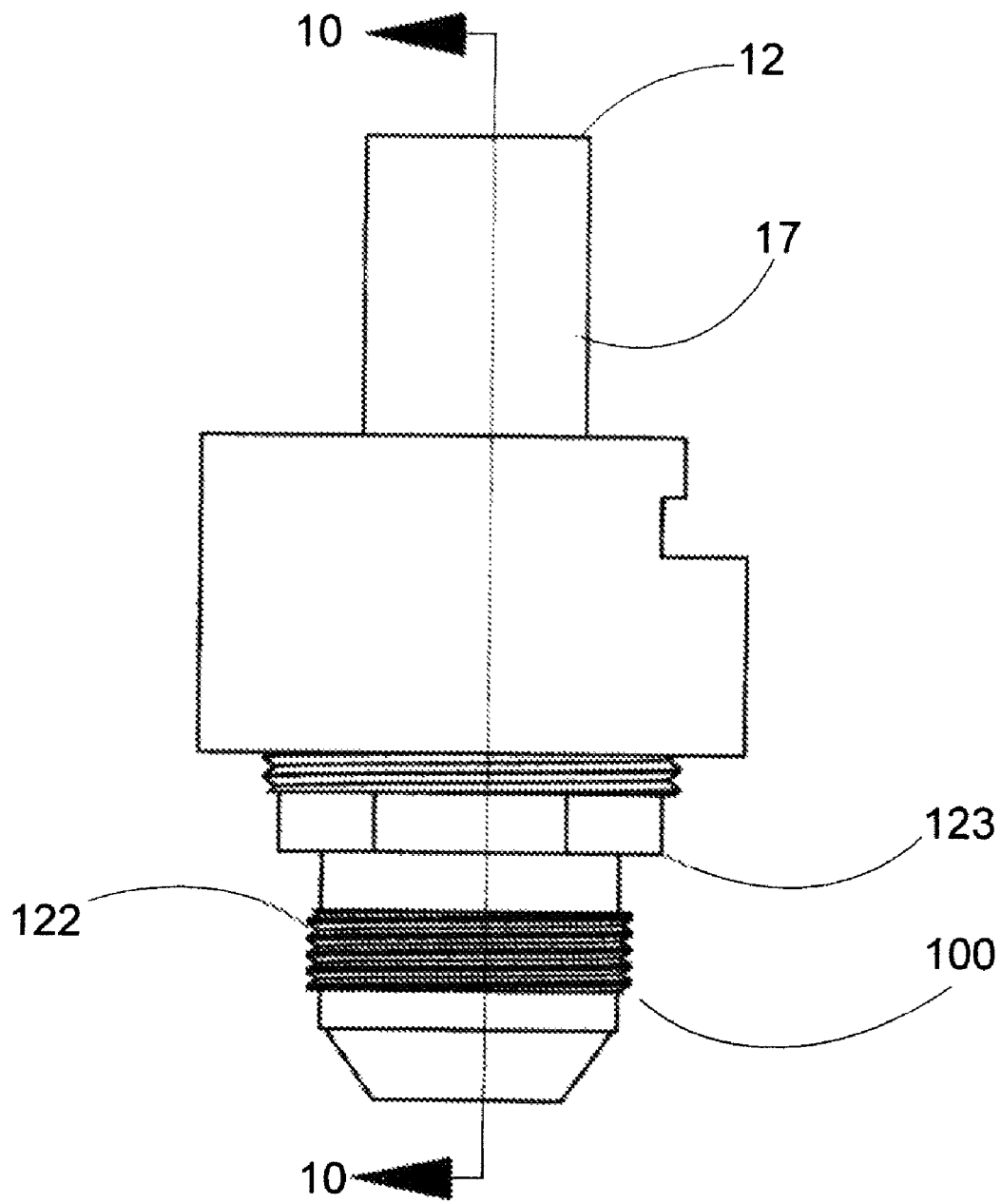
FIG. 9 is a side elevational view of an embodiment of coupling end cap according to the invention, assembled with the hydraulic fitting shown in FIGS. 1-3.
Figure 10:
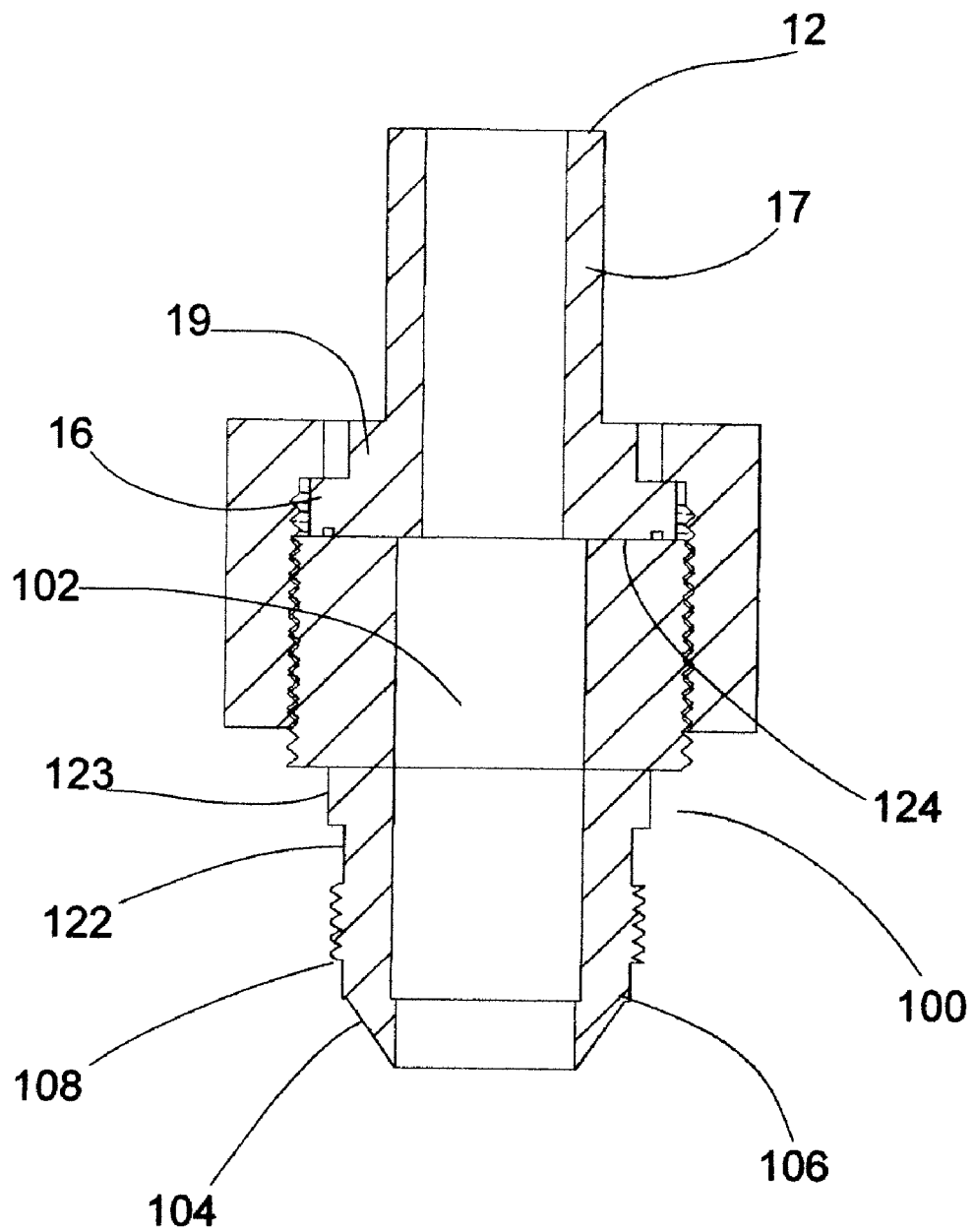
FIG. 10 is a section on the line 10-10 of FIG. 9.
Figure 11:
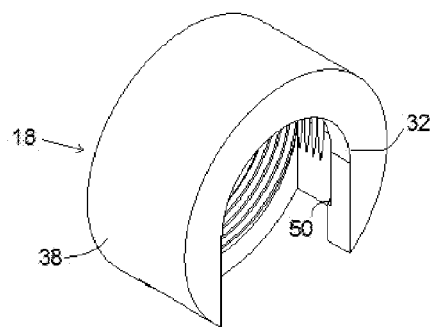
FIG. 11 is a front perspective view of a modified threaded ring for an end cap such as is shown in FIGS. 1-8.
Figure 12:
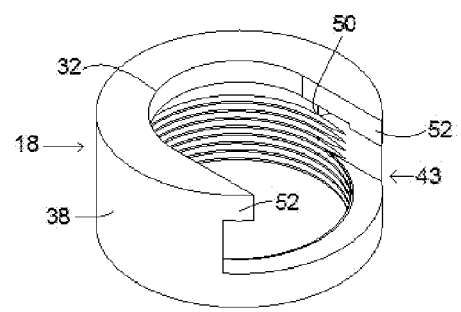
FIG. 12 is a perspective view of the threaded ring shown in FIG. 11 turned counterclockwise through 90°.
Figure 13:
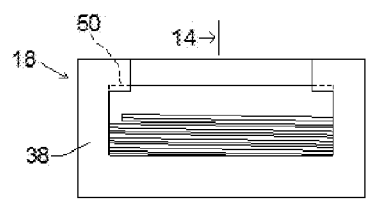
FIG. 13 is a view in the direction of an opening in the threaded ring shown in FIG. 12.
Figure 14:
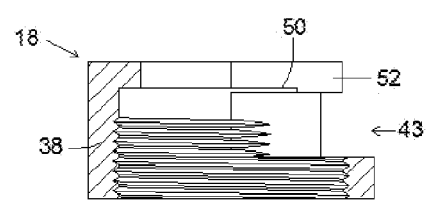
FIG. 14 is section on the line 14-14 of FIG. 13.

The embodiment of coupling end cap 100 illustrated in FIGS. 9-10 comprises a threaded insert 122 which differs from threaded insert 22 by comprising an axial passage 102 and a rearward end 123 which is modified as compared with rearward end 23 of insert 22. Axial passage 102 permits end cap 10 to function as a coupler and to be employed for coupling tubular hydraulic fitting 12 to another pipe, hose or other fitting or equipment for flow of hydraulic or other fluid to or from hydraulic fitting 12 and such other pipe, hose or other fitting. Rearward end 123 of threaded insert 122 has a frusto-conical or tapered external end surface 104 and a sidewall 106 bearing an external thread 108. Rearward end 123 is adapted for connection with a flow meter, pressure gauge or other desired equipment or fitting. Rearward end 123 can have any desired configuration, thread, diameter or other parameter according to the equipment or fitting with which it is employed or to be employed.

Multiple threaded inserts 122 can be provided, if desired, in combination with one or more threaded rings 18, to provide a set of couplers capable of coupling hydraulic fitting 12 to a wide range of equipment.

The forward end of threaded insert 122 is similar to that of threaded insert 22 save for the presence of axial passage 102 which results in threaded insert 122 having an end face 124 which is annular unlike the illustrated end face 24 of threaded insert 22 which is a continuous surface intended for closing open end 14, although other configurations of end face 24 are possible. Thus, threaded ring 18 also comprises a locking member 26 provided by side wall 44 configured with cutout 43 and U-shaped slot 46 to provide receiving opening 44. Similarly, coupling end cap 100 can be assembled with a hydraulic fitting 12 by axially aligning receiving opening 44 with annular flange 16 and sliding annular flange 16 along U-shaped slot 46 until annular flange 16 seats against the curved portion of U-shaped slot 46.

If desired, threaded insert 122 can first be assembled with other equipment and then threaded ring 18 can be screwed on to threaded insert 122 prior to attaching coupling end cap 100 to hydraulic fitting 12 to seal end face 124 against open end 14 of hydraulic fitting 12.

Useful embodiments of coupling end cap 100 can be quickly and easily assembled with hydraulic fitting 12 and optionally with other equipment, to provide a good leak-preventing seal with open end 14 of hydraulic fitting 12. Furthermore, in some embodiments of the invention the assembled hydraulic fitting 12, end cap 100, and other equipment to which rearward end 123 of threaded insert 122 is attached can be subjected to significant hydraulic or pneumatic pressure from fluid supplied within tubular body 17 or axial passage 102, for operational, service or test purposes, without leakage.

The invention can provide a robust end cap 10 or coupling end cap 100 which is securely held together and resistant to axial or lateral forces from lateral or axial stresses or impacts, that may be imposed in subsequent maintenance or other operations. Embodiments of end caps such as end cap 10 or coupling end cap 100 are useful in repair and service shops to assist in the maintenance of heavy industrial, construction or military hydraulic machinery, and for other purposes, as will be apparent to a person of ordinary skill in the art.

Various possible embodiments and variations of end cap 10 or of coupling end cap 100 that can be employed in the practice of the invention will be or become apparent to a person of ordinary skill in the art in light of this disclosure.

The foregoing detailed description is to be read in light of and in combination with the preceding background and invention summary descriptions wherein partial or complete information regarding the best mode of practicing the invention, or regarding modifications, alternatives or useful embodiments of the invention may also be set forth or suggested, as will be apparent to one skilled in the art. Should there appear to be conflict between the meaning of a term as used in the written description of the invention in this specification and the usage in material incorporated by reference from another document, the meaning as used herein is intended to prevail.

While illustrative embodiments of the invention have been described above, it is, of course, understood that many and various modifications will be apparent to those of ordinary skill in the relevant art, or may become apparent as the art develops, in the light of the foregoing description. Such modifications are contemplated as being within the spirit and scope of the invention or inventions disclosed in this specification.

The invention claimed is:

1. An end cap for capping an open end of a hydraulic fitting, the hydraulic fitting comprising a tubular body, and a peripheral annular flange, the peripheral annular flange projecting laterally from the tubular body, and extending around the open end of the hydraulic fitting, wherein the end cap is disengaged from the hydraulic fitting, and comprises:
   (a) a threaded ring threaded around an axis of the threaded ring;
   (b) a threaded insert threadably engageable with the threaded ring for movement along the ring axis with respect to the threaded ring in response to rotation of the threaded insert with respect to the threaded ring, the threaded insert comprising a forward end face, the forward end face filling the area of the threaded ring across the ring axis and being engageable with the open end of the hydraulic fitting;
   (c) a locking member integral with the threaded ring, the locking member being configured to embrace the peripheral annular flange, and defining with the threaded ring a lateral opening to receive the hydraulic fitting annular flange in a direction radially of the threaded ring axis,
      wherein the locking member comprises a U-shaped lip engageable with a locking surface on the hydraulic fitting annular flange, the locking surface being located remotely from the threaded ring,
      wherein the U-shaped lip includes an inner periphery comprising a part-circular portion and two parallel straight portions, the hydraulic fitting being receivable between the two parallel straight portions of the U-shaped lip, and
      wherein the U-shaped lip includes a part-circular recess to accommodate the hydraulic fitting annular flange for axial movement forwardly with respect to the lip, the part-circular recess defining retainers in the parallel straight portions of the U-shaped lip, the retainers preventing radial movement of the hydraulic fitting annular flange when the hydraulic fitting annular flange is accommodated in the part-circular recess;
   wherein the threaded insert can be inserted into the threaded ring and the threaded ring can be rotated to bring the end face of the threaded insert into engagement with the open end of the hydraulic fitting to close and seal the open end of the hydraulic fitting.

2. An end cap according to claim 1 wherein the threaded insert is rotatable to clamp the hydraulic fitting annular flange between the locking surface of the locking member and the engagement surface of the threaded insert.

3. An end cap according to claim 2 wherein the end face of the threaded insert comprises a plane surface which extends continuously across the threaded insert to fill the area of the threaded ring across the ring axis.

4. An end cap according to claim 1 wherein the lateral opening can remain open after the hydraulic fitting annular flange is received into the lateral opening.

5. An end cap according to claim 1 wherein the threaded ring comprises a side wall and the locking member comprises a forward portion of the side wall.

6. An end cap according to claim 5 wherein the side wall comprises a cutout, the cutout defining a side facing receiving opening and the side wall is undercut in the vicinity of the receiving opening to provide a U-shaped slot and wherein the flanged open end of the hydraulic fitting can be laterally received in the receiving opening and can be moved along the U-shaped slot.

7. An end cap according to claim 6 wherein the annular flange on the hydraulic fitting is a close sliding fit in the U-shaped slot.

8. An end cap according to claim 1 wherein the locking member comprises a continuous side wall of the threaded insert and the continuous side wall comprises the peripheral lip.

9. An end cap according to claim 1 wherein the threaded ring is a monolithic, one-piece member.

10. An end cap according to claim 1 wherein the threaded insert is partially screwed into the threaded ring.

11. An end cap according to claim 1 wherein the threaded insert comprises a solid plug.

\* \* \* \* \*